United States Patent [19]

Micco et al.

[11] Patent Number: 5,751,865
[45] Date of Patent: May 12, 1998

[54] METHOD AND APPARATUS FOR IMAGE ROTATION WITH REDUCED MEMORY USING JPEG COMPRESSION

[75] Inventors: Felice A. Micco, Webster; Martin E. Banton, Rochester, both of N.Y.

[73] Assignee: Xerox Corporation, Stamford, Conn.

[21] Appl. No.: 721,127

[22] Filed: Sep. 26, 1996

[51] Int. Cl.$^6$ .............................. G06K 9/32; G06K 9/36; H04N 1/41; H04N 1/415

[52] U.S. Cl. .......................... 382/296; 382/235; 382/297; 382/232; 358/426; 358/261.3; 358/432; 358/433

[58] Field of Search ............................ 382/250, 296, 382/297, 235, 232, 248; 358/426, 261.3, 432, 433, 444, 448, 452; 345/437

[56] References Cited

U.S. PATENT DOCUMENTS

| | | | |
|---|---|---|---|
| 5,257,113 | 10/1993 | Chen et al. | 358/426 |
| 5,319,724 | 6/1994 | Blonstein et al. | 382/232 |
| 5,327,248 | 7/1994 | Miller et al. | 358/261.4 |
| 5,408,425 | 4/1995 | Hou | 364/725 |

OTHER PUBLICATIONS

William P. Pennebaker et al; JPEG—Still Image Data Compression Standard; pp. 34 and 170.

Brian C. Smith and Lawrence A. Rowe; A New Family of Algorithms for Manipulating Compressed Images[1]; pp. 1–20.

Michael Shneier and Mohamed Abdul–Mottaleb; Exploiting The JPEG Compression Scheme for Image Retrieval; IEEE Transactions on Pattern Analysis and Machine Intelligence; vol. 18 No. 8, Aug. 1996.

James D. Murray and William van Ryper; Encyclopedia of Graphics file formats; Jul. 1994; pp. 158–171 and 376–383.

Xerox Disclosure Journal; Michael J. Denber; *Fast Small–Angle Bitmap Rotation*; vol. 17 No. 5 Sep./Oct. 1992; pp. 391–392.

Xerox Disclosure Journal; Robert V. Lorenze, Jr.; *Simple and Compact Method For Automated Duplex Printing Automated Duplex Printing*; vol. 21, No. 1 Jan./Feb. 1996; pp. 17–18.

*Primary Examiner*—Edward L. Coles
*Assistant Examiner*—Tia M. Harris
*Attorney, Agent, or Firm*—Duane C. Basch

[57] ABSTRACT

The present invention is a method and apparatus for the rotation of images in conjunction with a block-wise, variable-length data compression operation. In a preferred embodiment, the rotation of image blocks on a microscopic level is accomplished independently from the rotation of the blocks themselves (macroscopic), stored in electronic pre-collation memory and the rotated image produced upon decompression of the stored rotated data. The two stage process allows the use of standardized JPEG or similar variable-length compression schemes, thereby accomplishing the rotation in conjunction with compression and minimizing the need for large memory buffers to accomplish image rotation

13 Claims, 6 Drawing Sheets

METHOD AND APPARATUS FOR IMAGE ROTATION WITH REDUCED MEMORY USING JPEG COMPRESSION

This invention relates generally to the rotation of digital images, and more particularly to a method and apparatus to accomplish rotation in conjunction with a variable-length compression (e.g., JPEG (Journal of Photographic Experts)) operation so as to reduce the memory requirements for orthogonally rotating an image.

CROSS REFERENCE

The following related application is hereby incorporated by reference for its teachings:

"METHOD AND APPARATUS FOR ROTATION OF A JPEG COMPRESSED IMAGE," Ricardo L. deQueiroz., application Ser. No. 08/721,130, filed concurrently herewith. (D/96384)

BACKGROUND AND SUMMARY OF THE INVENTION

The present invention is directed to reducing the memory necessary to accomplish the orthogonal rotation of a digital image. In particular, this invention capitalizes on the need to store digitized images in a compressed format, and combines the rotation operation with a block-wise compression operation so as to accomplish the combined rotation and compression using conventional compression hardware in a computationally efficient manner.

Data compression is required in data handling processes, where too much data is present for practical applications using the data. Commonly, compression is used in communication links, to reduce transmission time or required bandwidth. Similarly, compression is preferred in image storage systems, including digital printers and copiers, where "pages" of a document to be printed may be stored temporarily in precollation memory. Here the amount of media space on which the image data is stored can be substantially reduced with compression. Generally speaking, scanned images, i.e., electronic representations of hard copy documents, are often large, and thus make desirable candidates for compression.

DCT (Discrete Cosine Transform), disseminated by the JPEG committee, is a lossy compression system which reduces data redundancies based oil pixel to pixel correlations. Generally, an image does not change very much on a pixel to pixel basis and therefore has what is known as "natural spatial correlation". In natural scenes, correlation is generalized, but not exact. Noise makes each pixel somewhat different from its neighbors.

Figure 1:
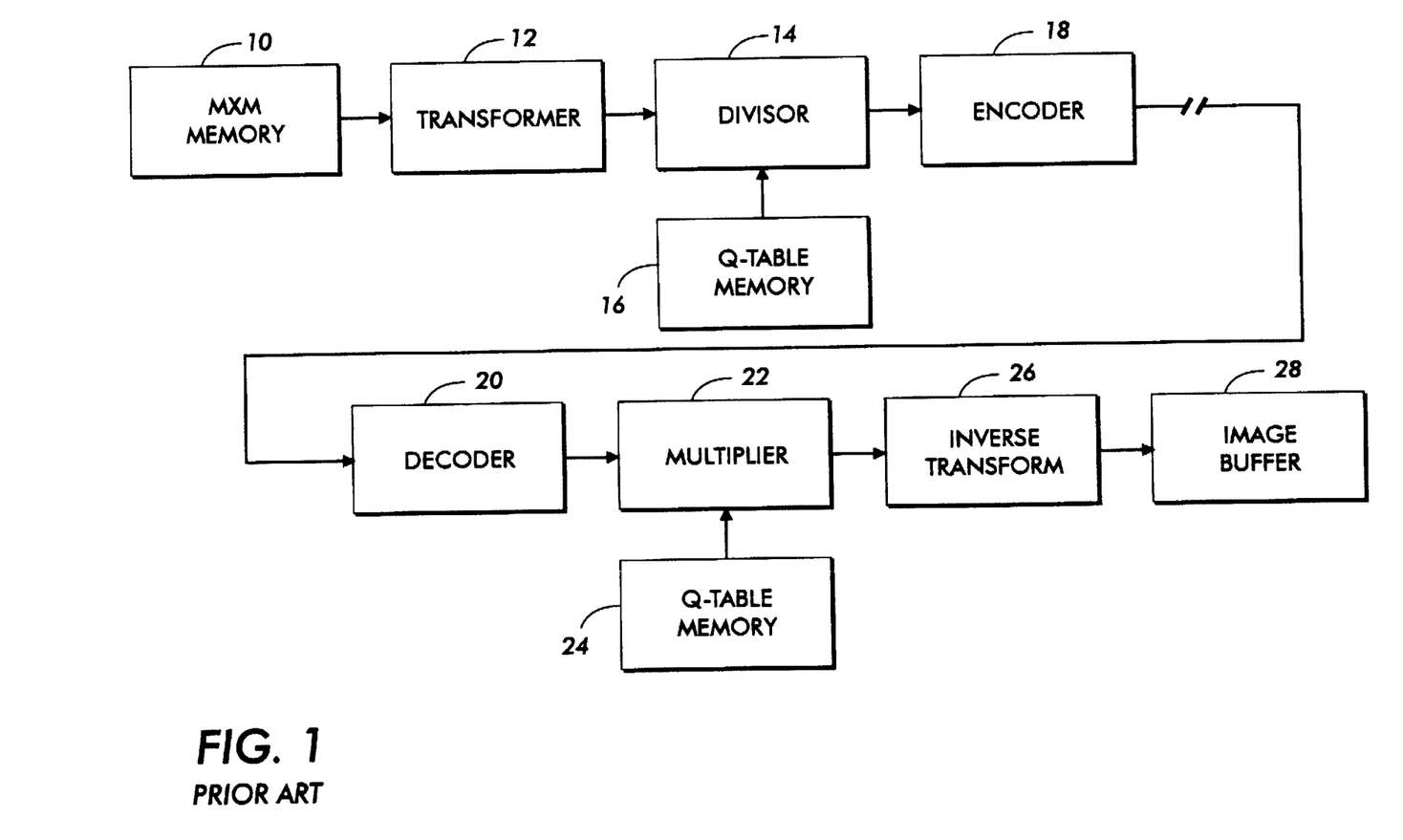
FIG. 1 is a block representation of a prior art JPEG digital image compression-decompression system.

Generally, as shown in FIG. 1, a JPEG DCT compression and decompression system is illustrated. A more complete discussion may be had by referencing the *Encyclopedia of Graphics File Formats*, by J. D. Murray and W. vanRyper, pp. 159-171 (1994, O'Reilly & Associates, Inc.) Further description of the JPEG standard may be found, for example, in "JPEG Still Image Data Compression Standard," by W. Pennebaker and J. Mitchell, 1993 (Van Nostrand Reinhold, New York) or "Discrete Cosine Transform: Algorithms, Advantages and Applications," by K. Rao and P. Yip, 1990 (Academic Press, San Diego). Initially provided is tile or block memory 10 storing an M×M segment of the image. From the portion of the image stored in memory, the discrete cosine transform (DCT), a frequency space representation of the image, is formed at transformer 12. Hardware implementations of the compression engine are available, such as the C-Cube Microsystems CL550A JPEG image compression processor, which operates in either the compression or the decompression mode according to the JPEG standard. As described below, the embodiments of the present invention may include hardware and/or software processing operations. A divisor/quantization device 14 is used, from a set of values referred to as a Q-Table, stored in a Q-Table memory 16, so that a distinct Q-Table value is divided into the DCT value, returning the integer portion of the value as the quantized DCT value. A Huffman encoder 18 uses statistical encoding applied to the quantized DCT values to generate the compressed image in a variable-length coded unit that is output for storage, transmission, etc.

To decompress compressed image data, and with continued reference to FIG. 1, a series of functions or steps are followed to reverse the process described. The Huffman encoding is removed at decoder 20. The image signal now represents the quantized DCT coefficients, which are multiplied at signal multiplier 22 by the Q-Table values in memory 24 in a process inverse to the compression process. At inverse transformer 26, the inverse transform of the discrete cosine transform is derived, and the output image in the spatial domain is stored at image buffer 28.

The present invention seeks to expand on a variable-length compression operation by adding an image rotation operation, where the M×M blocks or tiles within the image may be orthogonally rotated so as to accomplish the rotation of the entire image using the compressed image blocks and thereby avoiding the need for buffering large sections or the entire image.

Heretofore, a number of patents and publications have disclosed image compression or rotation operations, the relevant portions of some may be briefly summarized as follows:

U.S. Pat. No. 5,408,425 to H. S. Hou, issued Apr. 18, 1995, hereby incorporated by reference for its teachings, discloses a processor and method of computation for performing a discrete cosine transform.

U.S. Pat. No. 5,319,724 to S. M. Bloinstein et al., issued Jun. 7, 1994, teaches an apparatus and corresponding method for compressing still images while remaining compatible with a JPEG transformation.

U.S. Pat. No. 5,257,113 to Chen et al., issued Oct. 26, 1993, discloses a video mixing technique that employs JPEG compressed data. Windows within a video image are each represented as JPEG coded data streams. The streams are then mixed using a data structure, based upon the overlay configuration of the windows, to produce a composite frame of video information.

U.S. Pat. No. 5,327,248 to Miller et al., issued Jul. 8, 1994, teaches a compressed image virtual editing system, where the compressed image is the result of JPEG compression techniques. The system enables a decoding of selected blocks in the JPEG compressed image to create a virtual image. Subsequently, the virtual image may be edited and re-encoded thereby allowing editing of the virtual image only and without decoding the entire compressed image.

In accordance with the present invention, there is provided a method for rotating a digital image in accordance with a JPEG standard compression operation, the method comprising the steps of: dividing the digital image into blocks, each block being represented by digital data; rotating the digital data in each block; compressing the digital data for each block into a coded unit, wherein the compression is accomplished in a standard left-to-right, top-to-bottom sequence of blocks within the image; creating a pointer associated with each of a plurality of coded units after a first coded unit, wherein each pointer points to a coded unit other than the coded unit compressed immediately preceding the coded unit with which the pointer is associated; storing the coded units and associated pointers in an electronic precollation memory; retrieving from the electronic precollation memory the coded units in an order determined by the pointers associated with each coded unit, the order of retrieval being such that no coded unit is decompressed immediately following a block which immediately preceded the coded unit in the compressing step; and decompressing the coded units retrieved from the electronic precollation memory so as to produce a rotated image.

In accordance with another aspect of the present invention, there is provided an apparatus for rotating a digital image in accordance with a JPEG standard compression operation, comprising: a segmenter, said segmenter dividing the digital image into equally sized blocks, each block being represented by digital data a rotation circuit for rotating the digital data in each block in one of a plurality of orthogonal increments a compression processor, said processor compressing the digital data for each block into a coded unit, wherein the compression is accomplished in a standard left-to-right, top-to-bottom sequence of blocks within the image; local memory, associated with the compression processor, said local memory storing a pointer associated with each of a plurality of coded units after a first coded unit, wherein each pointer stored therein indicates a coded unit other than the coded unit compressed immediately preceding the coded unit with which the pointer is associated; an electronic precollation memory for storing the coded units and associated pointers, wherein the data stored in the electronic memory represents a rotated-compressed digital image.

One aspect of the invention deals with a basic problem in digital image processing systems - the memory and computationally intensive operation of image rotation. This aspect is further based on the discovery of a technique that alleviates this problem. The technique associates the rotation of a small image segment or block with a JPEG compression operation, and the management of the rotated-compressed blocks so as to enable rotation using minimal buffer memory.

This technique can be implemented, for example, by the combination of a small image rotation circuit or process, a block or segment management scheme and a standardized JPEG compression engine. Accordingly, the technique has application to any number of systems, including digital printers and copiers where there may be a necessity to orthogonally rotate the digital image. A machine implementing the invention can include a data or image processing system having the capability of JPEG compression. The technique and system described herein are advantageous because they are efficient and result in the ability to accomplish image rotation with little additional hardware or processing as compared to other memory intensive approaches.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low."

The term "data" includes data existing in any physical form, and includes data that are transitory or are being stored or transmitted. For example, data could exist as electromagnetic or other transmitted signals or as signals stored in electronic, magnetic, or other form.

An "image" is a pattern of physical light. An image may include characters, words, and text as well as other features such as graphics. A text may be included in a set of one or more images, such as in images of the pages of a document. An image may be divided into "segments," each of which is itself an image. A segment of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image. An item of data "defines" an image set when the item of data includes sufficient information to produce all the images in the set.

A "pixel" is the smallest segment into which an image is divided in a given system. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An item of data "relates to" part of an image, such as a pixel or a larger segment of the image, when the item of data has a relationship of any kind to the part of the image. For example, the item of data could define the part of the image.

as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An operation performs "image processing" when it operates on an item of data that relates to part of an image.

"Circuitry" or a "circuit" is any physical arrangement of matter that can respond to a first signal at one location or time by providing a second signal at another location or time.

A "memory" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs.

A "data processing system" is a physical system that processes data. A "data processor" or "processor" is any component or system that can process data, and may include one or more central processing units or other processing components.

A "data unit" or "unit of data" is an item of data that a processor can access or otherwise operate on as a unit. For example, an eight-bit byte is a data unit in many data processing systems. A "block" of items of data is a number of items of data that form a sequence. For example, a block or segment of an image would include data or signals representative of image pixels within a defined region of the image.

An "address" is an item of data that can be used to address a memory cell within memory circuitry that includes plural memory cells.

Stored data can be "accessed using" or "accessible using" other data if the memory containing the stored data responds to the other data or to data that depends on the other data by permitting access to the stored data. For example, the other data may be an address, an offset used to produce an address, or a content-addressable value stored with the stored data.

An operation "encodes" items of data when performing the operation on the items of data produces different items of data from which the encoded data items can subsequently be recovered. The operation that recovers the encoded data items is "decoding."

An "image input terminal" (IIT) is a device that can generate or receive an image and provide an item of data defining a version of the image. A "scanner" is an image input device that receives an image by a scanning operation, such as by scanning a document. Other image input terminals include facsimile machines computer graphic workstations.

An "image output terminal" (IOT) is a device that can receive an item of data defining an image and provide the image as output. A "display" is an image output device that provides the output image in human viewable form. The visible pattern presented by a display is a "displayed image" or simply "image."

Figure 2:
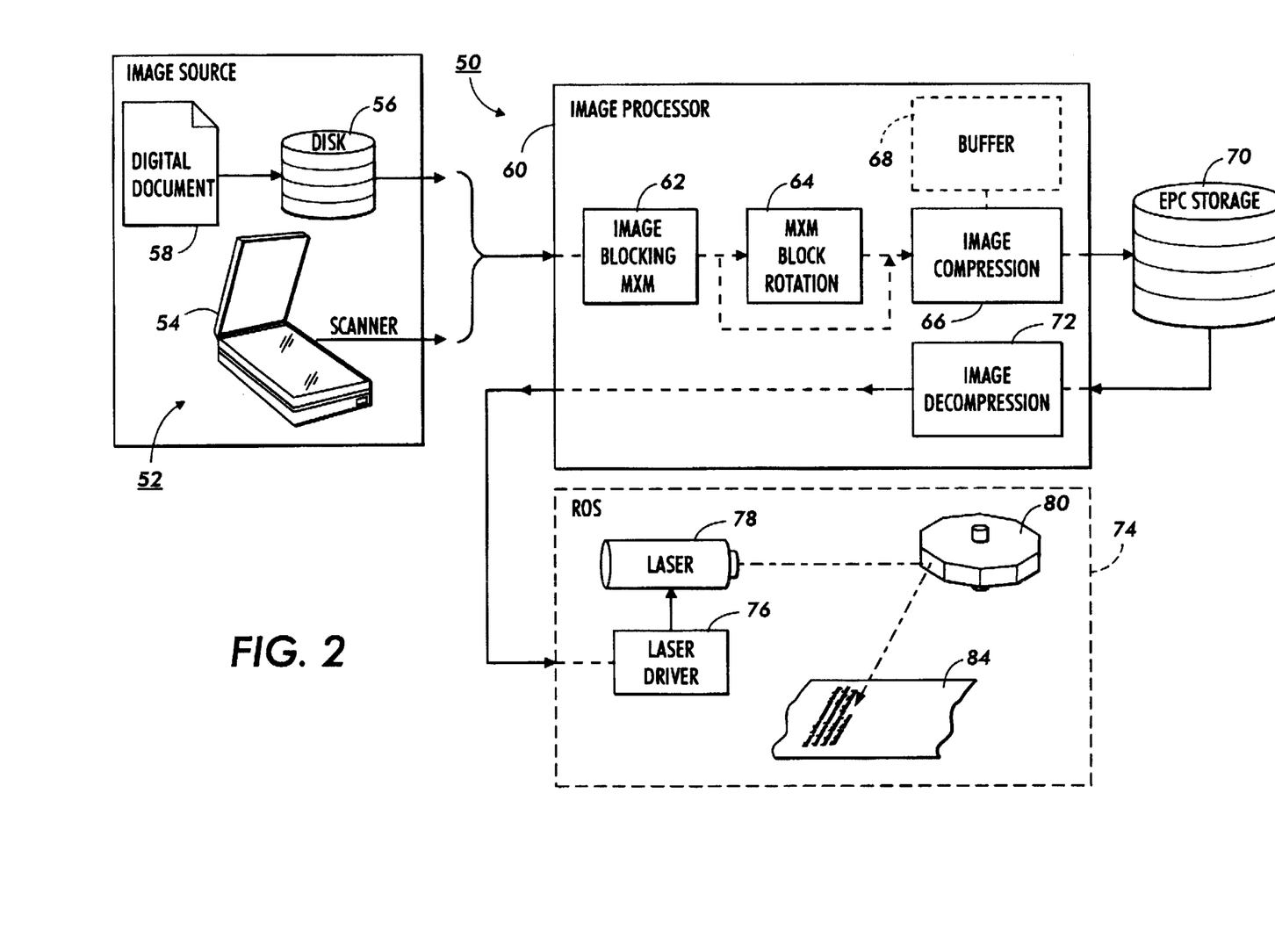
FIG. 2 is an illustration of a block diagram representing a digital printing system in which the present invention finds particular use.

Turning now to FIG. 2 displayed therein is a block diagram of a digital printing system 50 in which the present invention finds particular use. In particular, system 50 includes an image input terminal (IIT) 52 that may include any number of image sources such as a scanner 54 or storage medium (disk) 56 suitable for generating or otherwise providing a digital document 58. A digital document containing an image is the output of the IIT, and is provided to image processor 60 that forms a part of the printing system. Image processor 60, while preferably providing additional functionality, includes circuitry for carrying out the image rotation and compression operations in accordance with the present invention. In particular, image processor 60 includes an image blocking circuit 62 capable of dividing the digital data representing the image into a plurality of M×M blocks or segments. In one embodiment, the blocking operation may be accomplished by a windowing or cropping circuit that enables the transfer of data comprising one or more M×M blocks of data from the input document to an M×M data buffer 68. Once stored in a data buffer that is part of the image processing circuit, the data is next operated on by the block rotation circuitry depicted as block 64. In block 64, the data may be operated on in any of a number of well-known bit- or byte-wise operations to accomplish the rotation of the image data therein in one of three orthogonal increments. For example, in a simple 90 degree clockwise rotation, data for the pixel position in the upper-left corner of the M×M block would be rotated so that it is subsequently located in the upper-right corner of the rotated block.

Figure 4:
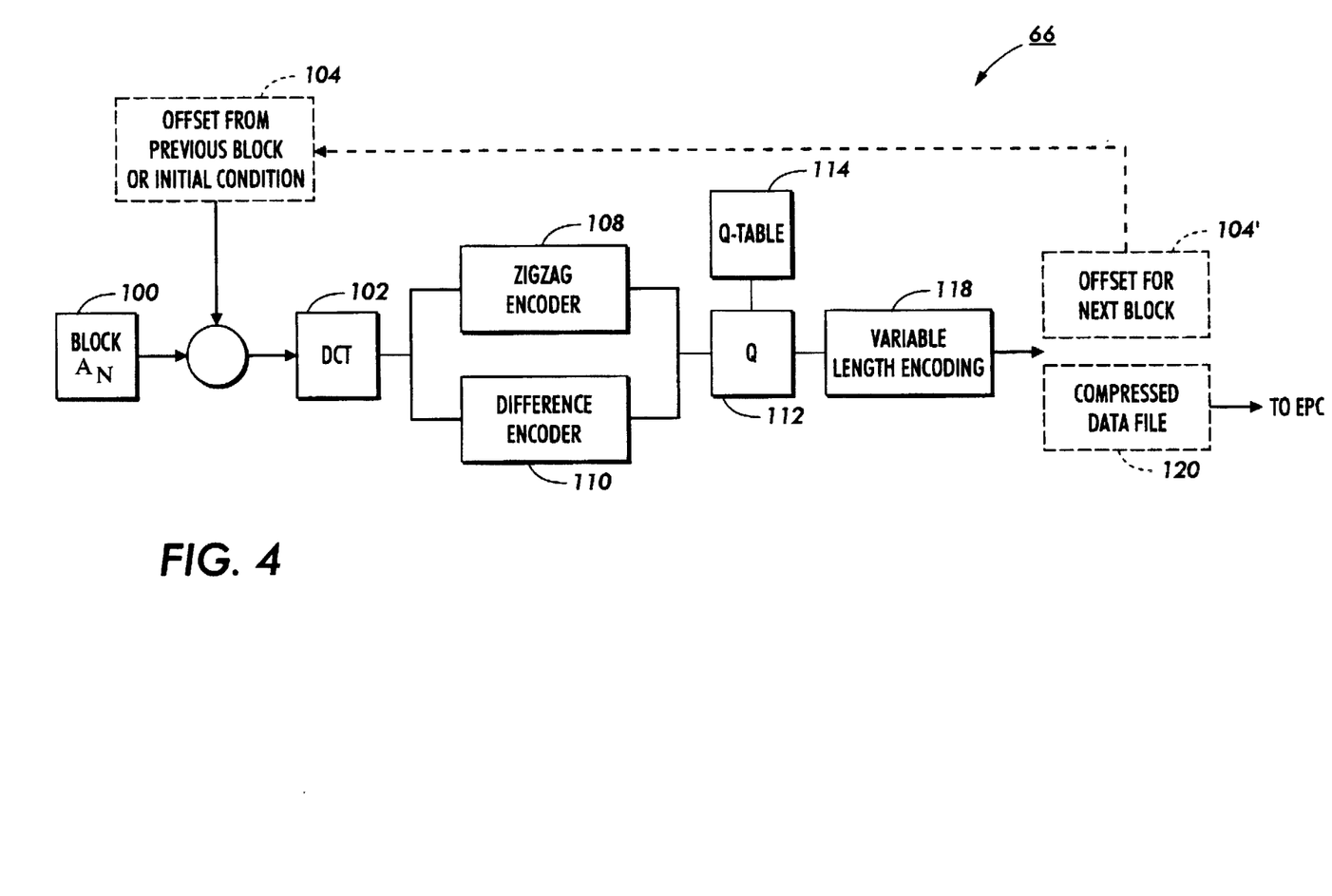
FIG. 4 is a flowchart illustrating the manner in which an image would be compressed using JPEG compression in the printing system of FIG. 2.
Figure 5:
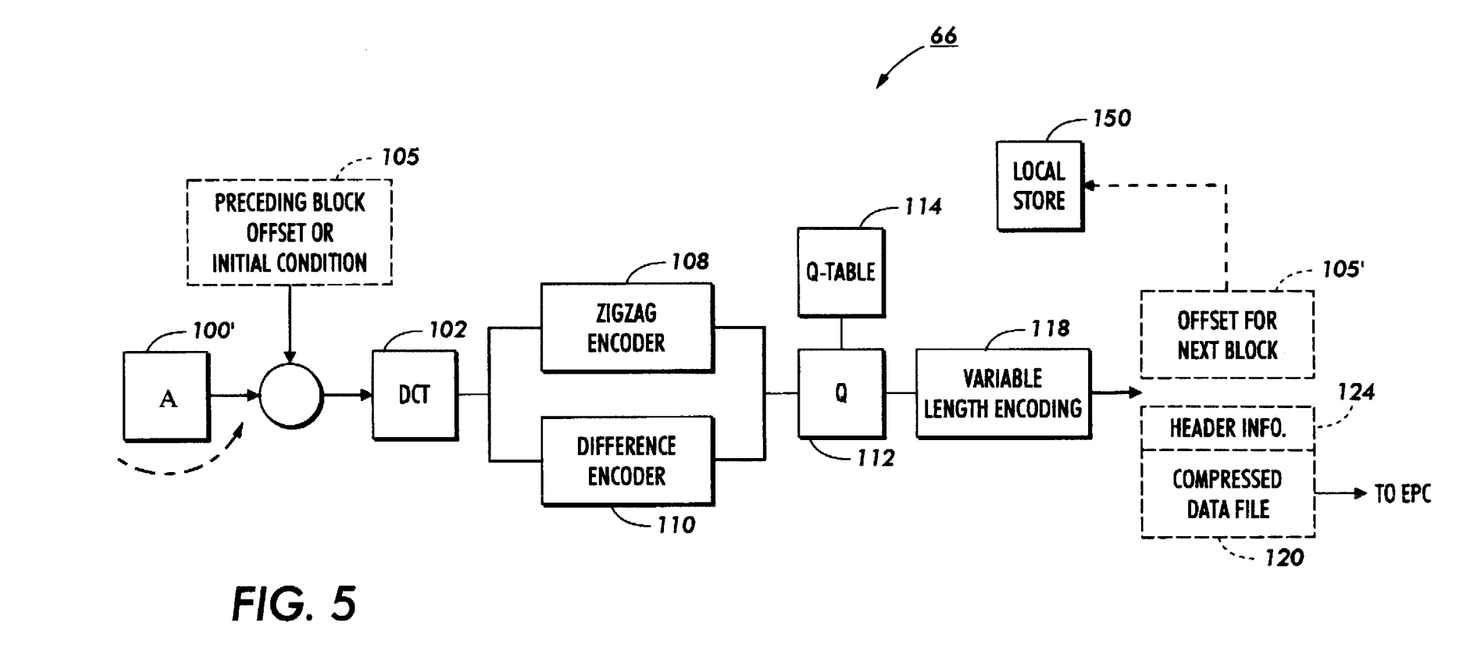
FIG. 5 is a flowchart illustrating the manner in which the combined rotation-compression operation would be accomplished in the printing system of FIG. 2 in accordance with the present invention.

Once rotated the M×M block of data is then preferably compressed in accordance with a JPEG standard compression scheme at image compression processor 66. Image compression processor 66 may be a software driven process operating on a CPU within the image processing system (as depicted in the flowcharts of FIGS. 4 and 5) or equivalently a dedicated image compression processor such as the C-Cube Microsystems CL550A JPEG image compression processor, which operates in either the compression or the decompression mode according to the JPEG standard. The output of the image compressor 66 is a coded unit of data that is then preferably stored in electronic precollation (EPC) memory 70 that, while depicted as a disk, may be any memory device suitable for storing one or a plurality of compressed image pages prior to printing by an IOT. As depicted in FIG. 2, IOT 74 may be a raster output scanning (ROS) print engine or any equivalent imaging device responsive to a digital data stream to produce a viewable image. The ROS depicted in FIG. 2 includes a laser driving circuit 76 that controls or modulates laser 78 in accordance with decompressed digital data produced by image decompressor 72. As is well-known, the decompressor receives the coded units of data and decodes the data to produce digital data suitable for driving an image output terminal. The laser in the ROS-based IOT 74 is used to illuminate or expose a photoresponisive member 84 by reflecting the laser generated light beam off of the plurality of surfaces found on rotating polygon 80 so as to create, by scanning, a latent image on member 84. Once the latent image is produced, it would be developed in accordance with any of a number of methods known to those skilled in the art to produce a visible image. It will be further appreciated that the digital image data may be employed to drive or otherwise control any number of image output terminals, including color output devices where the data representing an image may include a plurality of color separations each processed and stored as a separate image plane or in luminance-chrominance form to further reduce storage requirements.

Having described the general operation of a printing system employing the present invention, attention is now turned to specific details of the image processor 60. In particular, with reference to FIG. 3 there is depicted the segmentation of an exemplary image into tiles or blocks for compression, preferably in accordance with the JPEG standard, and subsequent rotation. Blocks $A_1$–$A_N$ represent the top-most 8 scanlines or rasters of data in the input image, while blocks A1–Z1 represent the left-most 8 pixels of each scanline in the image. Thus, each block or tile is an 8×8 segment of the image. As depicted in rotated image 58', each block is rotated (microscopic) and the relative position of each block is also moved or rotated (macroscopic) so as to accomplish a complete rotation of the image. It will be appreciated that the microscopic rotation of a single 8×8 block can be accomplished in a rapid fashion using an equivalently sized memory region so that the value associated with any pixel position is simply copied or moved to the corresponding rotated position. On the other hand, a more processing intensive approach may be to simply use a single register for temporary storage of the data associated with only a single pixel position and to move successive pixels therethrough to accomplish the rotation.

Figure 3:
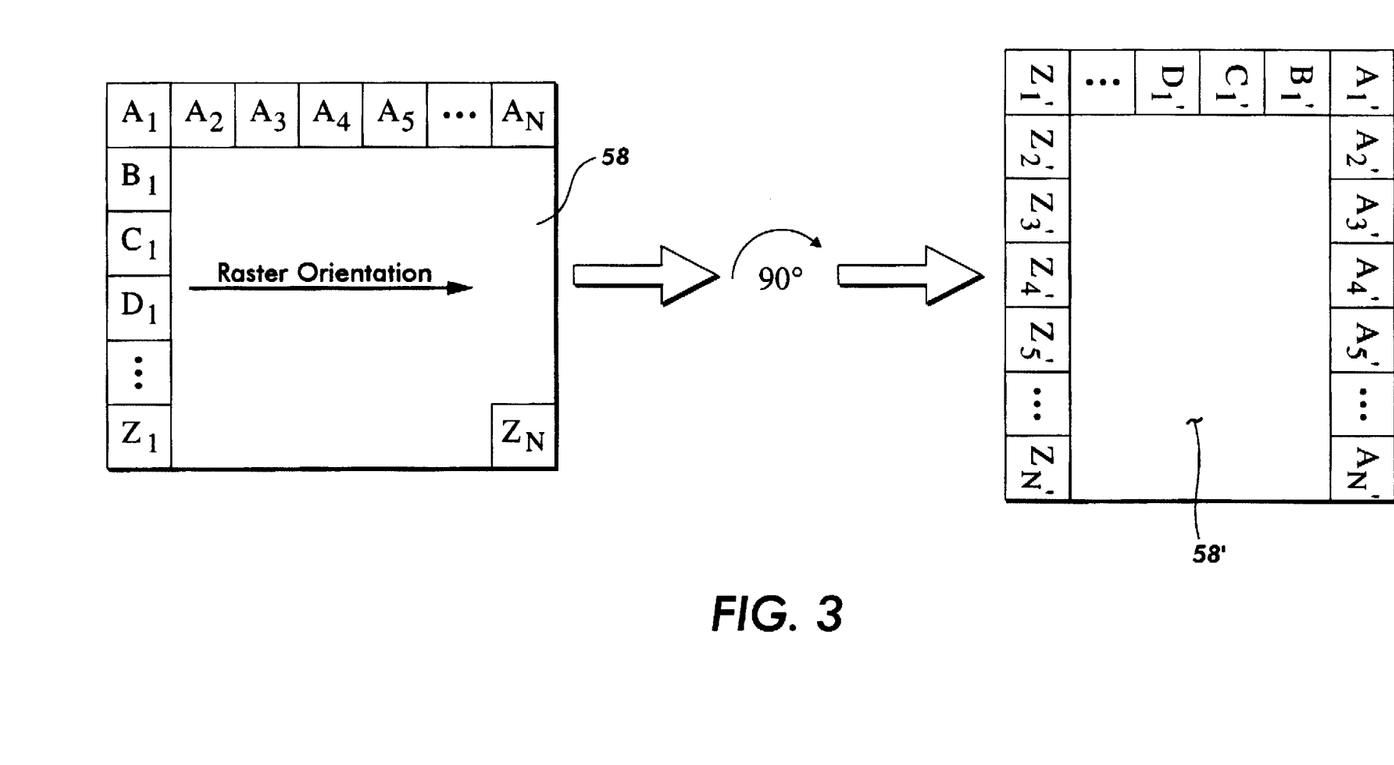
FIG. 3 is an illustration of the manner in which an exemplary image would be segmented into tiles or blocks for compression in accordance with the JPEG standard as applied in the printing system of FIG. 2.

Turning now to FIG. 4 depicted therein is a flowchart illustrating the manner in which an image would be compressed using JPEG compression in the printing system of FIG. 2. More specifically, an image block 100 such as block $A_N$ from FIG. 3 is input to a discrete cosine transform operation 102, where it, in conjunction with a DC basis function (DC Offset 104) from a previous block or initial condition, is processed. Subsequently, the DCT frequencies (dependent DC coefficient and independent AC coefficients) are passed to the ZigZag and difference encoders 108 and 110 and the outputs of both are combined during subsequent processing at the quantization operation 112. As is well-known with respect to the quantization process 112, the Q-Table input 114 is employed to tune the quality of the JPEG encoding operation. Subsequently, the coefficients resulting from quantization operation 112 are likely to contain redundant data. These coefficients are then encoded using a variable length encoding process 118 such as Huffman compression to produce a coded unit of data-a lossy representation of the 8×8 image block. Alternatively, other variable length encoding operations may be employed including, for example, an arithmetic entropy encoder. Once encoded, the coded unit of data 120 is then preferably stored in electronic precollation memory (EPC). The DC offset from the block 104' is also temporarily stored in a register or latch for use by a subsequent cycle of the encoding process and applied to the immediately following block.

Having described the basic operation of a JPEG compression technique for a non-rotated image, the flowchart of FIG. 5 will now be employed to illustrate the manner in which the combined rotation-compression operation would be accomplished in the printing system of FIG. 2. Initially, an input block of data containing a rotated set of pixels, as represented for example by $A_N'$ of FIG. 3 is provided to the image compression processor 66. However, the processing of a rotated image does not rely on the DC component of the immediately preceding block as in the general case. Here, as reflected by input 105, the DC offset employed in the discrete cosine transform operation 102 is based upon either the block that will precede the current block or an initial condition. Thus, for a 90 degree clockwise rotation, each block $A_1$–$A_N$ is treated as the first block in a sequence of blocks, and the DC offset values for each block must be stored in local memory storage 150 so that the DC offsets may be made available during the processing of blocks that will immediately follow each of the $A_1$–$A_N$ blocks in the rotated image. Accordingly, the output of the variable length encoding operation stores the DC offset in a local memory so that it is available when needed as an initial condition. It will be appreciated that the size of the local store is dependent upon the size, or more particularly width, of the initial image, requiring memory of sufficient size to store offsets of each block $A_1$–$A_N$. Also, because the coded units for the blocks are not necessarily stored in the EPC in the order in which they need to be retrieved to produce a decoded image, the coded unit 120 preferably includes header information 124. In a preferred embodiment, the data stored as header information would identify the location in EPC of the next block to be decompressed in the rotated image.

Figure 6:
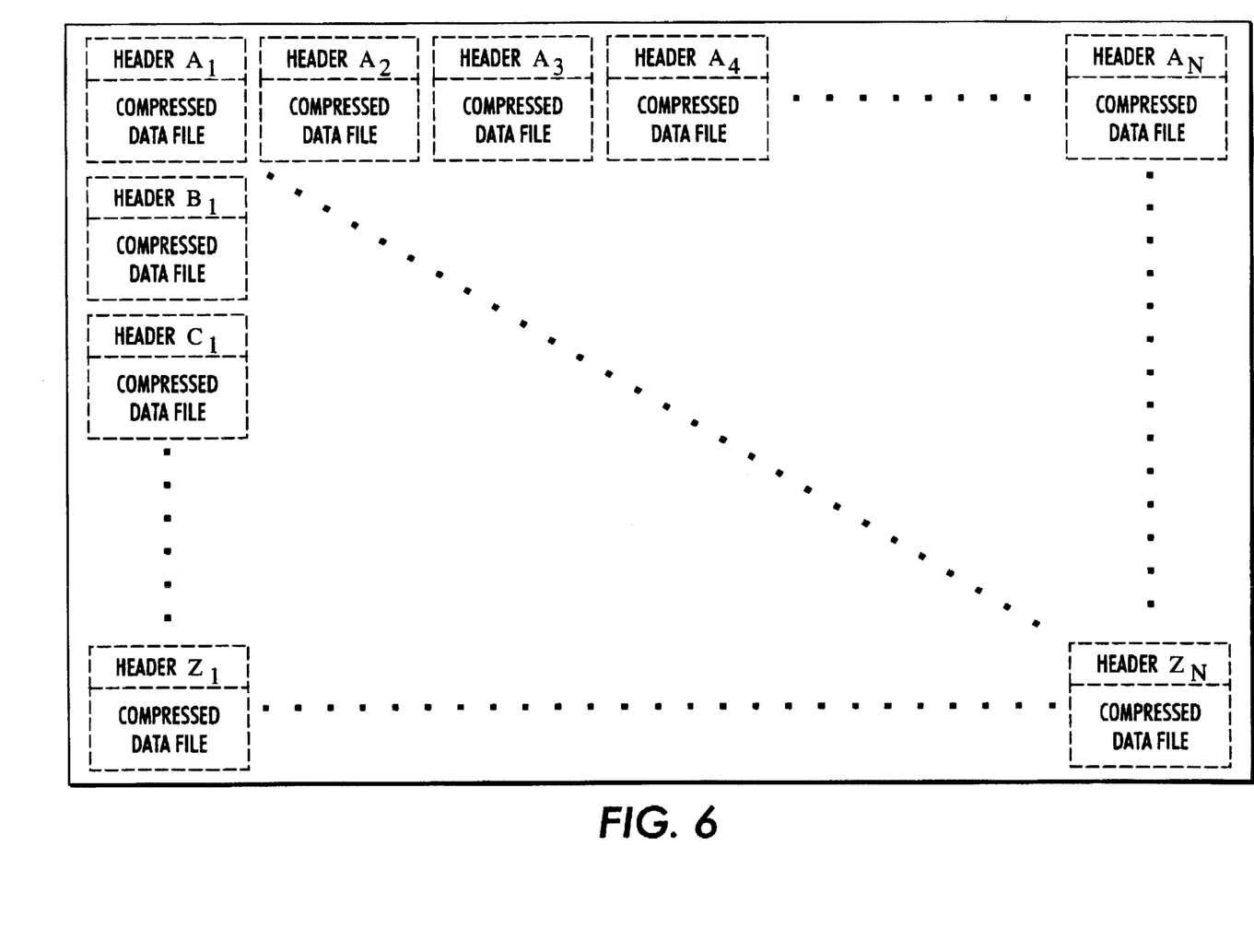
FIG. 6 is an exemplary illustration of the rotated-compressed data stored in electronic precollation memory in accordance with the present invention.

For example, referring to FIG. 6 there is depicted an enlarged view of the coded units stored in EPC memory. Here, each unit is stored in the sequence in which it was processed but the header information associated with each coded unit points to the block or memory location for the preceding and/or subsequent coded units. It will be appreciated that the addition of header information may increase that storage requirements for an image by a small amount. An alternative to the perpetual storage of the header information would be a post-processing operation carried out on the EPC stored coded units so as to re-order the coded units in accordance with the information contained in the header. As will be appreciated from the above description, the sequential storage and subsequent retrieval of coded units for the 90 degree rotated and compressed blocks would be as follows:

EPC Storage Order: $A_1, A_2, A_3, \ldots A_N, B_1, B_2, B_3, \ldots B_N, \ldots Z_N$;

and

EPC retrieval Order: $A_1, B_1, C_1, \ldots Z_1, A_2, B_2, C_2, \ldots Z_2, \ldots A_N, B_N, C_N, \ldots Z_N$.

Thus, the blocks of the image will be placed in a rotated location to complete the rotation on a macroscopic scale.

In recapitulation, the present invention is a method and apparatus for the rotation of images in conjunction with a block-wise, variable-length data compression operation. In a preferred embodiment, the rotation of image blocks on a microscopic level is accomplished independently from the rotation of the blocks themselves (macroscopic), stored in electronic precollation memory and the rotated image produced upon decompression of the stored rotated data. The two stage process allows the use of standardized JPEG or similar variable-length compression schemes, thereby accomplishing the rotation in conjunction with compression and minimizing the need for large memory buffers to accomplish image rotation. Accordingly, the technique has application to any number of systems, including digital printers and copiers where there may be a necessity to orthogonally rotate the digital image.

It is, therefore, apparent that there has been provided, in accordance with the present invention, a method and apparatus for the combined rotation and compression of a digital image. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method for rotating a digital image in accordance with a compression operation, the method comprising the steps of:

dividing the digital image into blocks, each block being represented by digital data;

rotating the digital data in each block;

compressing the digital data for each block into a coded unit;

creating a pointer associated with each of a plurality of coded units after a first coded unit, wherein at least one pointer points to a coded unit other than the coded unit compressed immediately preceding the coded unit with which the pointer is associated;

storing the coded units and associated pointers in an electronic precollation memory;

retrieving from the electronic precollation memory the coded units in an order determined by the pointers associated with each coded unit, the order of retrieval being such that no coded unit is decompressed immediately following a block which immediately preceded the coded unit in the compressing step; and decompressing the coded units retrieved from the electronic precollation memory so as to produce a rotated image.

2. The method of claim 1, wherein the compression is accomplished in a standard left-to-right, top-to-bottom sequence of blocks within the image.

3. The method of claim 1, wherein the coded unit represents a DC coefficient dependent upon a preceding coded unit and a plurality of AC coefficients, and where the step of creating a pointer further includes the step of temporarily storing the DC coefficient associated with each block in a local memory so that the DC coefficient is available for reference during the compression of a subsequent block.

4. The method of claim 2, wherein the step of creating a pointer associated with each of the plurality of coded units comprises the steps of:

storing in a local memory, for each of the blocks along the top of the image, the location of the block in electronic precollation memory to initiate each of a plurality of row pointers;

after compressing each block into a coded unit, updating the pointer associated with the block so that the pointer indicates the location stored for the row of the compressed block in the local memory; and after storing the coded unit and associated pointer in electronic precollation memory, updating the pointer in local memory for the row in which the block will be decompressed to reflect the location of the coded unit in electronic precollation memory.

5. The method of claim 1, wherein the step of decompressing the coded units further includes the step of referencing, based upon the pointer associated with a particular coded unit, a DC component of a non-immediately preceding coded unit.

6. The method of claim 1, wherein the compression operation is performed in accordance with a JPEG standard.

7. The method of claim 5, wherein the coded unit is a variable-length coded unit.

8. An apparatus for rotating a digital image in accordance with a JPEG compression operation, comprising:

a segmenter, said segmenter dividing the digital image into equally sized blocks, each block being represented by digital data;

a rotation circuit for rotating the digital data in each block in one of a plurality of orthogonal increments;

a compression processor, said processor compressing the digital data for each block into a coded unit;

local memory, associated with the compression processor, said local memory storing a pointer associated with each of a plurality of coded units after a first coded unit, wherein each pointer stored therein indicates a coded unit other than the coded unit compressed immediately preceding the coded unit with which the pointer is associated; and electronic precollation memory for storing the coded units and associated pointers, wherein the data stored in the electronic memory represents a rotated-compressed digital image.

9. The apparatus of claim 8, further including:

means for retrieving from the electronic precollation memory the coded units in an order determined by the pointers associated with each coded unit, the order of retrieval being such that no coded unit is decompressed immediately following a block which immediately preceded the coded unit in the compressing step; and a decompression processor, said decompression processor decompressing the coded units retrieved from the electronic precollation memory so as to produce a rotated image.

10. The apparatus of claim 8, wherein the compression processor operates on the blocks in a left-to-right, top-to-bottom sequence of blocks within the digital image.

11. The apparatus of claim 8, wherein the coded unit includes a representation of a DC coefficient that is dependent upon a preceding coded unit and a plurality of AC coefficients, and where the DC coefficient associated with each block is also stored in said local memory so that the DC coefficient may be reference by said compression processor during the compression of a subsequent block.

12. The apparatus of claim 8, wherein the pointer associated with each of the plurality of coded units includes a storage location of the coded unit in electronic precollation memory.

13. The apparatus of claim 8, wherein the compression processor operates in accordance with a JPEG standard.

* * * * *